(12) United States Patent
Yamafuji

(10) Patent No.: US 7,766,113 B2
(45) Date of Patent: Aug. 3, 2010

(54) MOUNT STRUCTURE FOR ELECTRIC UNIT

(75) Inventor: Takahiro Yamafuji, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 183 days.

(21) Appl. No.: 11/365,675

(22) Filed: Mar. 2, 2006

(65) Prior Publication Data

US 2006/0201753 A1    Sep. 14, 2006

(30) Foreign Application Priority Data

Mar. 9, 2005  (JP) .............................. 2005-065500

(51) Int. Cl.
    *B60R 16/00*    (2006.01)
(52) U.S. Cl. ..................... 180/68.5; 180/291; 180/271
(58) Field of Classification Search ............... 180/65.1, 180/68.5, 291; 280/232, 271, 274
See application file for complete search history.

(56) References Cited

U.S. PATENT DOCUMENTS

| | | | |
|---|---|---|---|
| 6,460,642 B1* | 10/2002 | Hirano | 180/65.1 |
| 7,172,042 B2* | 2/2007 | Yamaguchi et al. | 180/65.1 |
| 2002/0158513 A1* | 10/2002 | Amano et al. | 307/10.6 |
| 2004/0129465 A1* | 7/2004 | Yamaguchi | 180/65.2 |
| 2004/0134699 A1* | 7/2004 | Shimizu | 180/68.5 |
| 2004/0200647 A1* | 10/2004 | Shingo et al. | 180/65.2 |

FOREIGN PATENT DOCUMENTS

| | | |
|---|---|---|
| EP | 0 931 704 A2 | 7/1999 |
| EP | 1 260 427 A2 | 11/2002 |
| EP | 1 440 834 A1 | 7/2004 |
| JP | 2001-097052 | 4/2001 |
| JP | 2002-095142 A | 3/2002 |
| JP | 2002-347450 A | 12/2002 |
| JP | 2003-291663 | 10/2003 |
| JP | 2004-082940 A | 3/2004 |
| JP | 2004-161055 A | 6/2004 |
| JP | 2004-175301 A | 6/2004 |
| JP | 2005-104387 A | 4/2005 |

* cited by examiner

*Primary Examiner*—Paul N Dickson
*Assistant Examiner*—Katy Meyer
(74) *Attorney, Agent, or Firm*—Kenyon & Kenyon LLP

(57) ABSTRACT

A mount structure for an electric unit is a mount structure for a PCU mounted in an engine room of a hybrid vehicle. The mount structure includes a vehicle body, the PCU mounted in the engine room, an engine mounted on the vehicle body and spaced from PCU, a cable connected to the PCU and having a portion positioned between the PCU and the engine, and a wire-protecting portion positioned between the PCU and the engine and keeping the distance between the PCU and the cable and the distance between the engine and the cable at respective distances that are at least distances necessary for wiring protection.

8 Claims, 6 Drawing Sheets

MOUNT STRUCTURE FOR ELECTRIC UNIT

This nonprovisional application is based on Japanese Patent Application No. 2005-065500 filed with the Japan Patent Office on Mar. 9, 2005, the entire contents of which are hereby incorporated by reference.

BACKGROUND OF THE INVENTION

1. Field of the Invention

The present invention relates to a mount structure for an electric unit. In particular, the invention relates to a structure for mounting an electric unit, having a wire-protecting portion formed for preventing wiring from getting caught between some objects.

2. Description of the Background Art

A hybrid vehicle having an electric unit that includes for example an inverter and that is mounted in an engine room has been known. For example, Japanese Patent Laying-Open No. 2004-082940 discloses a vehicle having a PCU that includes an inverter and that is mounted in an engine room where an engine and a motor-generator are disposed.

Japanese Patent Laying-Open No. 2002-095142 discloses a structure for protecting a battery harness, providing a protruding portion as a shock absorber to a support of the harness extending through a floor panel in order to prevent the floor panel from being brought into contact with the harness when a collision occurs.

Further, Japanese Patent Laying-Open No. 2004-175301 discloses an electric vehicle having a jutting-out portion that is provided to a PCU to serve as a shock-absorbing portion in order to protect a battery placed in a bottom portion of the PCU from impact.

There is a tendency for electrically-driven vehicles to employ a unit operating at a relatively high voltage for obtaining a sufficient driving force. Accordingly, high-voltage cables are arranged in an engine room.

In such a mount structure as the one disclosed in Japanese Patent Laying-Open No. 2004-082940, there is a case where a cable connected to an electric unit is drawn between a plurality of components. In this case, if the components are caused to move by such an external factor as impact, the cable could get caught between the components. This is not preferable in terms of protection of the cable. Although a protector may separately be provided for preventing electrical leakage from the cable, which results in increases in cost and space for mounting.

Moreover, Japanese Patent Laying-Open Nos. 2002-095142 and 2004-175301 do not disclose the idea of setting the distance between components at a certain distance or more for the purpose of protecting cables.

SUMMARY OF THE INVENTION

An object of the present invention is to provide a mount structure for an electric unit that has a wire-protecting portion formed for keeping a gap necessary for protecting wiring.

A mount structure for an electric unit according to the present invention is a mount structure for an electric unit that is mounted in a closed space of a vehicle. The mount structure includes: a base body; the electric unit mounted on the base body and in the closed space of the vehicle; another unit mounted on the base body and spaced from the electric unit; a wiring connected to the electric unit and having a portion positioned between the electric unit and the other unit; and a wire-protecting portion positioned between the electric unit and the other unit and keeping the distance between the electric unit and the wiring and the distance between the other unit and the wiring at respective distances that are at least distances necessary for protecting the wiring.

The above-described structure can be used to protect, when the electric unit and the other unit come closer to each other, wirings by keeping a certain distance from the electric unit and the other unit.

Regarding the mount structure for the electric unit, preferably the electric unit is an electric unit for a voltage of at least 42 V.

It is important to avoid damages to wirings connected to such an electric unit used at a high voltage. With the above-described structure, such high-voltage wirings can be protected.

Regarding the mount structure for the electric unit, an example of the electric unit includes an inverter.

To an inverter mounted on an electrically-driven vehicle, a wiring of a relatively high voltage is connected in some cases. With the above-described structure, such a wiring connected to the inverter can be protected.

Regarding the mount structure for the electric unit, preferably the closed space is an engine room and the other unit is an engine body.

The space within the engine room is limited and thus wirings are placed between the engine and any electric unit in most cases. Thus, the wire-protecting portion can be provided between the engine and the electric unit to prevent wirings from being caught therebetween.

Regarding the mount structure for the electric unit, an example of the wire-protecting portion is a bracket protruding from the electric unit toward the other unit, and the bracket holds the wiring.

Since the bracket is provided, the distance between the electric unit and the other unit can be kept at a length that is at least the length of the bracket. Accordingly, the wiring can be prevented from getting caught between the electric unit and the other unit. In addition, since the bracket holds the wiring, the wiring can be prevented from being displaced from the original position over time. Accordingly, the wire-protecting effect can be enhanced.

Regarding the mount structure for the electric unit, an example of the wire-protecting portion is a bracket protruding from the other unit toward the electric unit, and the bracket holds the wiring. Another example of the wire-protecting portion is a spacer connected to a component other than the electric unit and the other unit and is positioned between the electric unit and the other unit, and the spacer holds the wiring.

These structures can also be used to achieve effects similar to the aforementioned one.

According to the present invention, as discussed above, a wiring disposed between a plurality of components can thus be protected.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
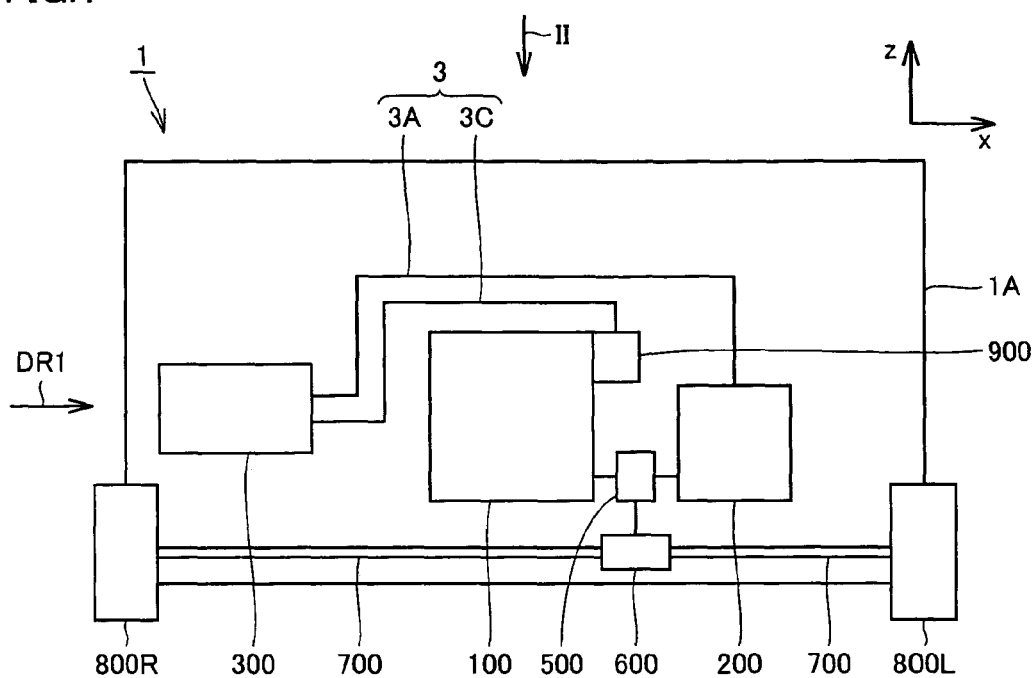
FIG. 1 is a schematic diagram showing a structure of a hybrid vehicle having a mount structure for an electric unit according to an embodiment of the present invention.

A description is given below of embodiments of a mount structure for an electric unit according to the present invention. It is noted that like or corresponding components are denoted by like reference characters and the description thereof may not be repeated.

Figure 2:
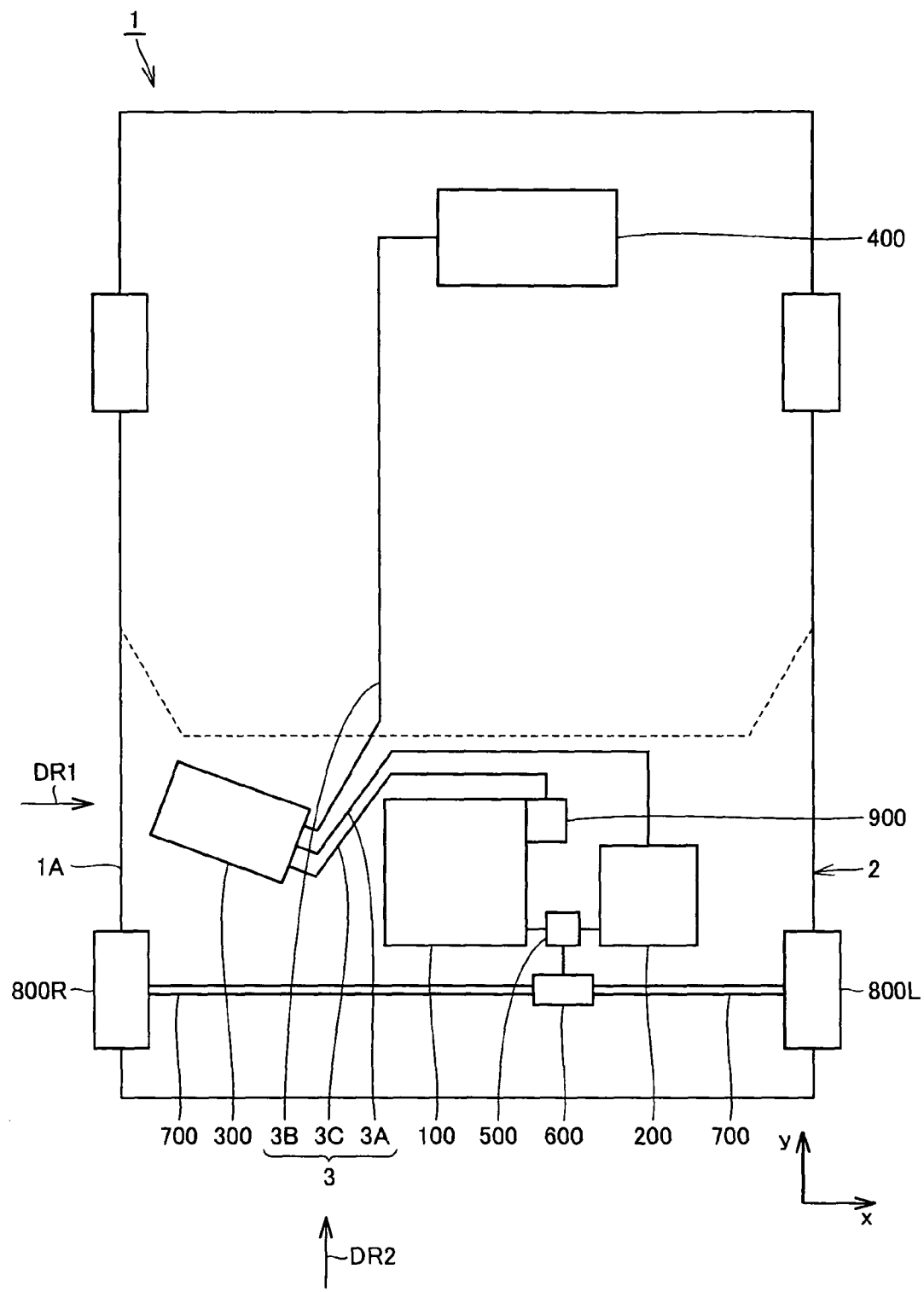
FIG. 2 is a schematic diagram showing the structure of the hybrid vehicle as seen in the direction indicated by arrow II in FIG. 1.

FIGS. 1 and 2 are schematic diagrams each showing a structure of a hybrid vehicle having a mount structure for an electric unit according to an embodiment of the present invention. FIG. 2 shows a state seen in the direction of arrow II in FIG. 1.

Referring to FIGS. 1 and 2, hybrid vehicle 1 includes a vehicle body 1A, an engine 100, a motor-generator 200, a PCU (Power Control Unit) 300, a battery 400, a drive division mechanism 500, a differential mechanism 600, a drive shaft 700, driving wheels 800L, 800R that are front wheels, and an A/C (air/conditioner) compressor 900.

As shown in FIG. 2, engine 100, motor-generator 200, PCU 300, drive division mechanism 500, and A/C compressor 900 are placed in an engine room 2. In the example shown in FIG. 2, PCU 300 is provided between a cowl and a front-wheel suspension in a side portion of the vehicle. Motor-generator 200 and PCU 300 are connected by a cable 3A. PCU 300 and battery 400 are connected by a cable 3B. PCU 300 and A/C compressor 900 are connected by a cable 3C. A power output apparatus comprised of engine 100 and motor-generator 200 is connected through drive division mechanism 500 to differential mechanism 600. Differential mechanism 600 is connected through drive shaft 700 to driving wheels 800L, 800R.

Motor-generator 200 is a three-phase AC synchronous motor-generator that generates a driving force from AC power supplied from PCU 300. Motor-generator 200 is also used as a generator when hybrid vehicle 1 is decelerating for example for generating AC power by its power-generating function (regenerative power generation) and outputs the generated AC power to PCU 300.

PCU 300 converts a DC voltage supplied from battery 400 into an AC voltage for driving and controlling motor-generator 200. PCU 300 also converts an AC voltage generated by motor-generator 200 into a DC voltage for charging battery 400.

Drive division mechanism 500 is configured to include for example a planetary gear (not shown).

Motive power that is output from engine 100 and/or motor-generator 200 is transmitted from drive division mechanism 500 through differential mechanism 600 to drive shaft 700. The drive power transmitted to drive shaft 700 is transmitted as a rotational force to drive wheels 800L, 800R for causing the vehicle to run. Thus, motor-generator 200 operates as an electric motor.

In contrast, when the vehicle is decelerating for example, drive wheels 800L, 800R or engine 100 drive(s) motor-generator 200. At this time, motor-generator 200 operates as an electric generator. The electric power generated by motor-generator 200 is stored through an inverter in PCU 300 in battery 400.

Figure 3:
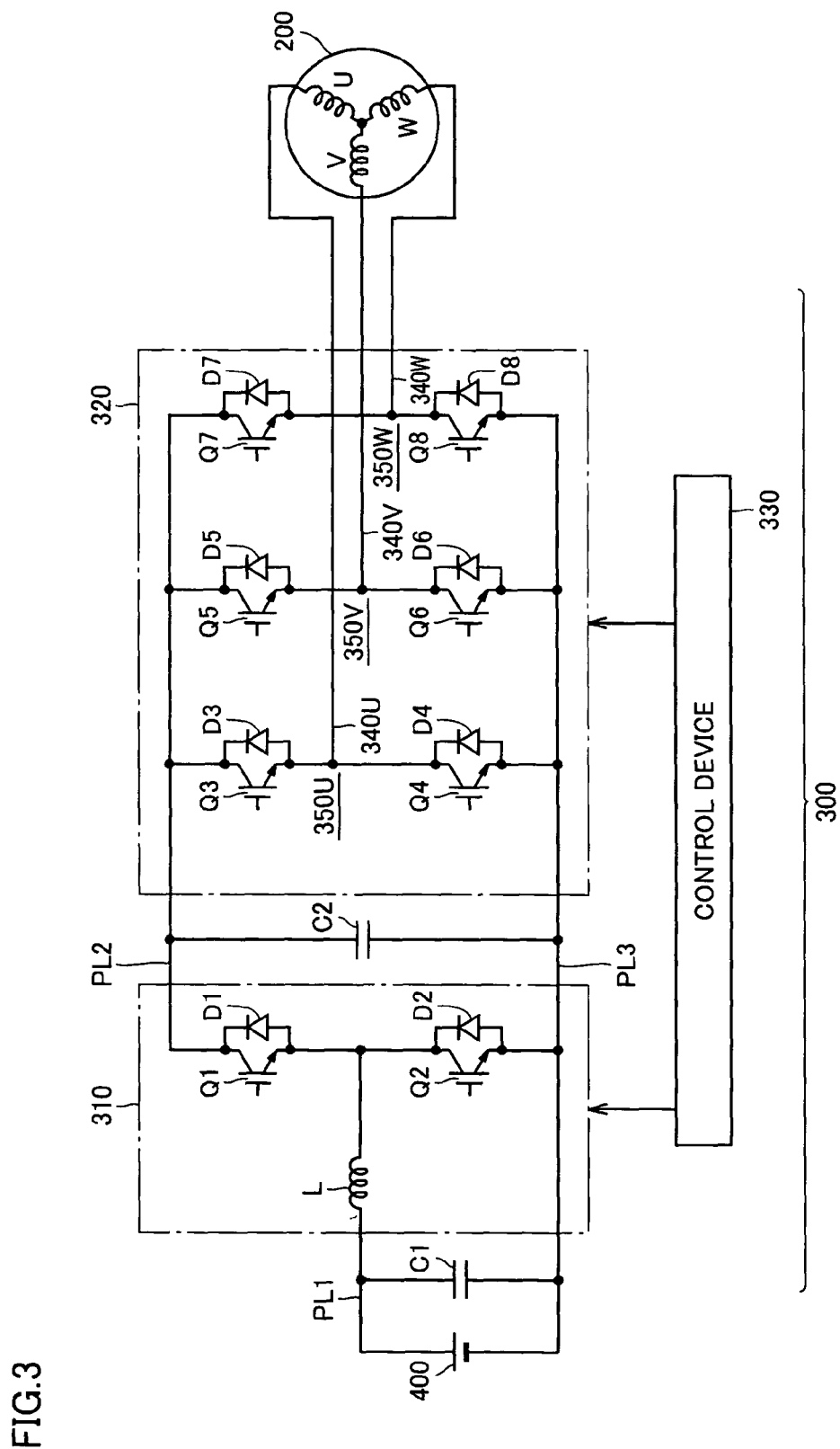
FIG. 3 is a circuit diagram showing a configuration of main components of a PCU shown in FIGS. 1 and 2.

FIG. 3 is a circuit diagram showing a configuration of main components of PCU 300. Referring to FIG. 3, PCU 300 includes a converter 310, an inverter 320, a control device 330, capacitors C1, C2, power-supply lines PL1-PL3, and output lines 340U, 340V, 340W. Converter 310 is connected between battery 400 and inverter 320 and inverter 320 is connected through output lines 340U, 340V, 340W to motor-generator 200.

Battery 400 connected to converter 310 is secondary battery, for example, of nickel hydride or lithium ion. Battery 400 supplies a generated DC voltage to converter 310 and is charged with a DC voltage supplied from converter 310.

Converter 310 is comprised of power transistors Q1, Q2, diodes D1, D2, and a reactor L. Power transistors Q1, Q2 are connected in series between power supply line PL2 and power supply line PL3 and receive, at respective bases, a control signal from control device 330. Diodes D1, D2 are connected between respective collectors and emitters of power transistors Q1, Q2 to flow electric current from respective emitters to respective collectors of power transistors Q1, Q2. Reactor L has one end connected to power supply line PL1 connected to the positive pole of battery 400 and the other end connected to a point where power transistors Q1, Q2 are connected to each other.

Converter 310 uses reactor L to boost a DC voltage supplied from battery 400 and supplies the boosted voltage to power supply line PL2. Converter 310 also steps down a DC voltage supplied from inverter 320 to charge battery 400.

Inverter 320 is comprised of a U-phase arm 350U, a V-phase arm 350V and a W-phase arm 350W. These phase arms are connected in parallel between power supply line PL2 and power supply line PL3. U-phase arm 350U includes series-connected power transistors Q3, Q4, V-phase arm 350V includes series-connected power transistors Q5, Q6 and W-phase arm 350W includes series-connected power transistors Q7, Q8. Diodes D3-D8 are connected between respective collectors and emitters of power transistors Q3-Q8 for flowing current from respective emitters to respective collectors of power transistors Q3-Q8. The point of connection between the power transistors of each phase arm is connected through a corresponding one of output lines 340U, 340V, 340W to an end of a corresponding phase coil of motor-generator 200 that is opposite to the neutral point thereof Based on a control signal from control device 330, inverter 320 converts a DC voltage supplied from power supply line PL2 into an AC voltage and outputs the AC voltage to motor-generator 200. Inverter 320 also rectifies an AC voltage generated by motor-generator 200 and supplies a resultant DC voltage to power supply line PL2.

Capacitor C1 is connected between power supply lines PL1 and PL3 and smoothes the voltage level of power supply line PL1. Capacitor C2 is connected between power supply lines PL2 and PL3 and smoothes the voltage level of power supply line PL2.

Based on a motor torque command value, each phase current value of motor-generator 200 and an input voltage to inverter 320, control device 330 calculates each phase coil voltage of motor-generator 200 and, based on the result of the calculation, generates a PWM (Pulse Width Modulation) signal for turning on/off power transistors Q3-Q8 to output the generated signal to inverter 320.

Further, based on the aforementioned motor torque command value and the speed (the number of revolutions) of the motor, control device 330 calculates the duty ratios of power transistors Q1, Q2 for optimizing the input voltage to inverter 320. Then, based on the result of the calculation, control device 330 generates a PWM signal for turning on/off power transistors Q1, Q2 and outputs the signal to converter 310.

Furthermore, control device 330 controls a switching operation of power transistors Q1-Q8 in converter 310 and inverter 320 for converting an AC power generated by motor-generator 200 and thereby charging battery 400.

In this PCU 300, based on a control signal from control device 330, converter 310 boosts a DC voltage supplied from battery 400 to supply the resultant voltage to power supply line PL2. Inverter 320 receives from power supply line PL2 the DC voltage smoothed by capacitor C2, converts this DC voltage into an AC voltage and outputs the AC voltage to motor-generator 200.

Moreover, inverter 320 converts an AC voltage generated by the regenerative operation of motor-generator 200 into a DC voltage and outputs the DC voltage to power supply line PL2. Converter 310 receives from power supply line PL2 the DC voltage smoothed by capacitor C2 and steps down the DC voltage to charge battery 400.

Cables 3 (3A, 3B, 3C) shown in FIGS. 1 and 2 are high-voltage wirings used at relatively high voltages (at least 200 V and at most 600 V approximately, for example). It is thus important to protect cables 3 and prevent electrical leakage from cables 3.

For example, there could be the case where a vehicle's collision or the like occurs to cause PCU 300 to move in the direction of arrow DR1 (see FIGS. 1 and 2). In this case, cables 3 located between PCU 300 and another unit (engine 100 for example) have to be protected for preventing cables 3 from being damaged.

Figure 4:
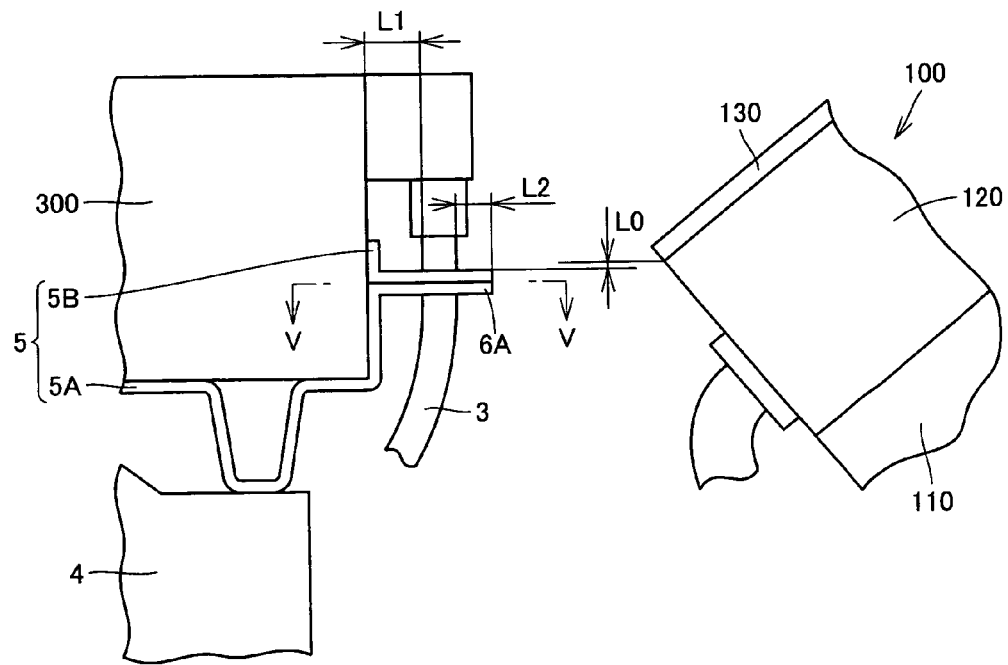
FIG. 4 shows a mount structure for an electric unit in the embodiment of the present invention.
Figure 5:
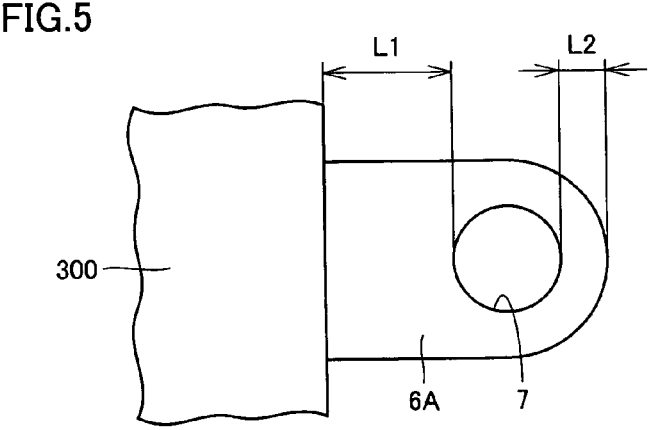
FIG. 5 shows a wire-protecting portion shown in FIG. 4 corresponding to the cross section along V-V in FIG. 4.

FIG. 4 shows a mount structure for an electric unit (PCU 300) in the present embodiment, as seen in the direction indicated by arrow DR2 in FIG. 2. FIG. 5 corresponds to a cross section along V-V in FIG. 4. Referring to FIGS. 4 and 5, PCU 300 is placed on a base 4 with a metal fitting 5 therebetween. Metal fitting 5 (5A, 5B) forms a bracket 6A. Bracket 6A has a hole 7 and cable 3 passes through hole 7. Cable 3 is thus held by bracket 6A.

As shown in FIG. 4, engine 100 is placed adjacently to PCU 300. Engine 100 has an engine body including a cylinder block 110, a cylinder head 120 and a cylinder head cover 130. The engine body also includes such engine parts as a part of valve mechanism positioned in cylinder head cover 130. Bracket 6A is provided to protrude from PCU 300 toward engine 100.

Bracket 6A is placed at a height corresponding to cylinder head 120. In the example shown in FIG. 4, the distance (height) between the top surface of bracket 6A and the top end of cylinder head 120 is L0. Accordingly, when PCU 300 moves in the direction indicated by arrow DR1, bracket 6A is brought into contact with cylinder head 120. The distance between a side surface of PCU 300 and one lateral end of hole 7 that faces PCU 300 is L1, while the distance between the other lateral end of hole 7 that faces engine 100 and the laterally leading end of bracket 6A is L2.

Figure 6:
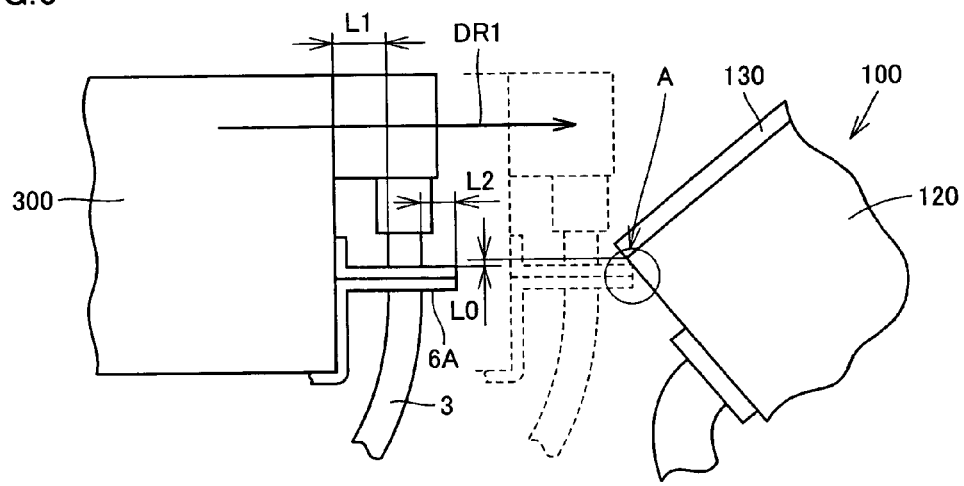
FIG. 6 illustrates a mechanism of protecting a wiring by the mount structure for an electric unit shown in FIG. 4.

FIG. 6 illustrates a mechanism of protecting cables by the above-described mount structure. Referring to FIG. 6, when PCU 300 moves in the direction indicated by arrow DR1, the distance between engine 100 and cable 3 decreases.

Here, cable 3 is held by bracket 6A. Bracket 6A protrudes to be positioned closer to engine 100 with respect to cable 3. Thus, even if PCU 300 moves in the direction indicated by arrow DR1, bracket 6A is the first to be brought into contact with engine 100 to prevent contact between cable 3 and engine 100 (portion A in FIG. 6). Cylinder head 120 with which bracket 6A is brought into contact is higher in stiffness than bracket 6A. Therefore, even if bracket 6A contacts the cylinder head, the cylinder head hardly deforms. As cylinder head 120, the body of PCU 300 hardly deforms as well. Therefore, bracket 6A may be formed to be rigid enough to prevent bracket 6A from deforming upon impact and rigid enough to prevent any problem in wiring protection. Then, the gap between PCU 300 and engine 100 can be kept at a distance substantially corresponding to at least the length of bracket 6A. In this way, it can be prevented that cable 3 gets caught between PCU 300 and engine 100 and is thus damaged.

As described above, since bracket 6A is provided, the distance between cable 3 and PCU 300 is kept at approximately L1 and the distance between cable 3 and engine 100 is kept at approximately L2 even when PCU 300 is moved. Here, L1 and L2 may appropriately be changed by changing the length of bracket 6A. Therefore, bracket 6A may be formed to provide respective values of L1 and L2 that correspond to at least respective distances necessary for protection of cable 3. Then, even if PCU 300 is moved, cable 3 positioned between PCU 300 and engine 100 can be protected.

As seen from the above, bracket 6A can be used to protect cable 3 upon collision of the vehicle while avoiding increases in cost and space. In other words, bracket 6A corresponds to "wire-protecting portion." Specifically, bracket 6A corresponds to "restraining portion" that restrains movement of PCU 300 and thereby restrains the interval between PCU 300 and engine 100 from decreasing.

In the example shown in FIGS. 4-6, the distance that is necessary for wiring protection is ensured by allowing bracket 6A to contact cylinder head 120 which is a rigid member of the engine body. Alternatively, the distance necessary for wiring protection may be ensured by allowing bracket 6A to contact cylinder block 110. Further, bracket 6A may be provided at a height corresponding to engine components in cylinder head cover 130. Cylinder head cover 130 is a relatively soft member and thus bracket 6A could pass through cylinder head cover 130. However, in this case as well, any component (e.g. cam shaft that is a part of valve mechanism) in cylinder head cover 130 may serve as a rigid member.

Figure 7:
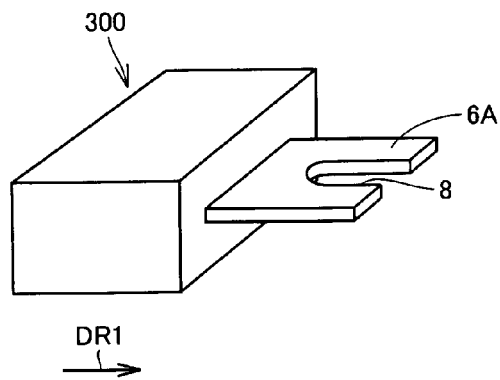
FIG. 7 shows a modification of the wire-protecting portion.
Figure 8:
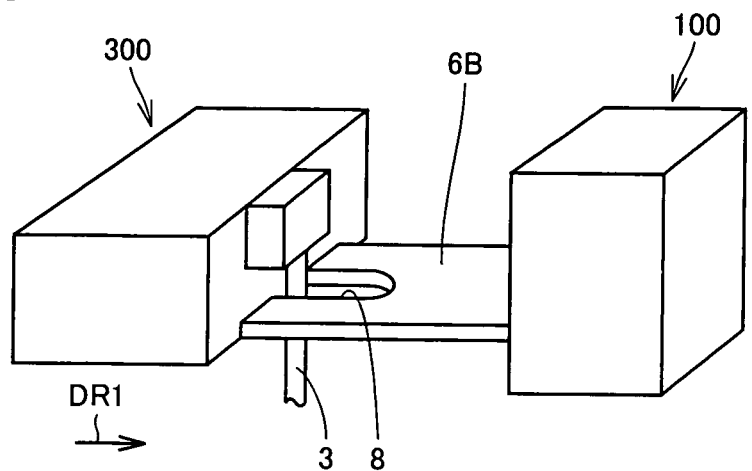
FIG. 8 shows another modification of the wire-protecting portion.
Figure 9:
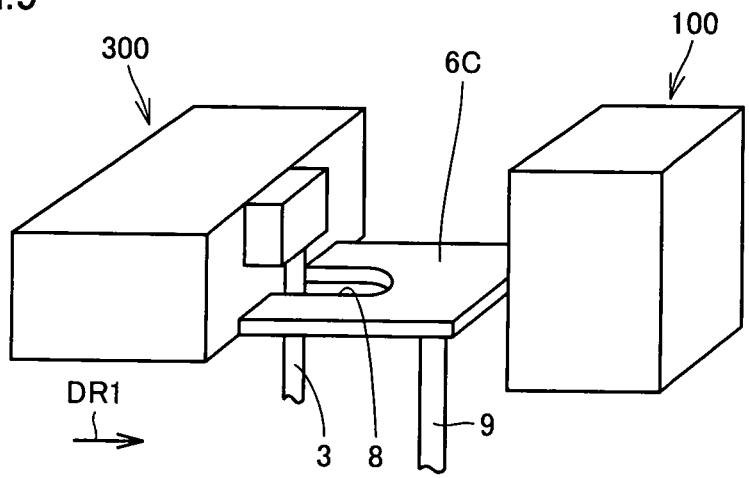
FIG. 9 shows still another modification of the wire-protecting portion.

FIGS. 7-9 each show a modification of the above-described mount structure. Referring to FIG. 7, bracket 6A may have a recess 8 instead of hole 7. As the hole, recess 8 can also be used to hold cable 3. Referring to FIG. 8, instead of bracket 6A protruding from PCU 300, a bracket 6B protruding from engine 100 toward PCU 300 may be provided. Here, since bracket 6B has a recess 8, even if PCU 300 and engine 100 come close to each other, cable 3 is prevented from getting caught between bracket 6B and PCU 300. Referring to FIG. 9, instead of brackets 6A, 6B, a spacer 6C attached to a column 9 extending upright from any part except for engine 100 and PCU 300 may be provided. Spacer 6C has a part that faces PCU 300 and that has a recess 8. Therefore, even when PCU 300 and engine 100 come closer to each other, cable 3 can be prevented from getting caught between spacer 6C and PCU 300.

Bracket 6B and spacer 6C as described above can also be used to protect cables. In other words, as bracket 6A, bracket 6B and spacer 6C each correspond to "wire-protecting portion."

In summary, a mount structure for an electric unit in the present embodiment is the mount structure for PCU 300 mounted in engine room 2 that is a closed space of hybrid vehicle 1. The mount structure includes a vehicle body 1A that is a base body, PCU 300 mounted in engine room 2, engine 100 mounted on vehicle body 1A to be spaced from PCU 300, cables 3A, 3B, 3C connected to PCU 300 and having a part thereof placed between PCU 300 and engine 100, and a wire-protecting portion (bracket 6A for example) placed between PCU 300 and engine 100 and keeping the distance between PCU 300 and cables 3A, 3B, 3C and the distance between engine 100 and cables 3A, 3B, 3C respectively at respective distances (approximately L1, L2 for example) necessary for wiring protection.

The present embodiment has been described as applied to the case where engine room 2 of hybrid vehicle 1 corresponds to "closed space of the vehicle," PCU 300 including converter 310, inverter 320 and capacitors C1, C2 corresponds to "electric unit," and engine 100 corresponds to "another unit." In general, there is a tendency that many components are arranged in engine room 2 and thus the space is limited. However, the idea heretofore discussed can be applied to cable 3 provided in engine room 2 to simultaneously achieve the reduction in space where electric equipment is placed and wiring protection.

It is noted that the above-described "vehicle," "closed space," "electric unit," and "another unit" are not limited respectively to "hybrid vehicle 1," "engine room 2," "PCU 300" and "engine 100." This "electric unit" may be any except for PCU 300 that is a unit operating at a relatively high voltage (approximately 42 V or higher for example) and that is a unit for which protection of connecting wires is desired. For example, as "electric unit," a unit including at least one of converter, inverter and capacitor or a high-voltage actuator may be used.

As heretofore discussed, the wire-protecting portion can be provided to keep the interval between PCU 300 and engine 100 at approximately an interval that is at least the length of brackets 6A or 6B or spacer 6C. Accordingly, a wiring can be prevented from getting caught between PCU 300 and engine 100. Further, hole 7 or recess 8 formed in "wire-protecting portion" holds cable 3 to prevent cable 3 from being shifted in position. Accordingly, the effect of the cable protection is enhanced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mount structure for an electric unit mounted in a closed space of a vehicle, comprising:
    a base body;
    the electric unit mounted on said base body and in the closed space of the vehicle;
    another unit mounted on said base body and spaced laterally from said electric unit; and
    a wiring connected to said electric unit and having a portion positioned between said electric unit and said other unit,
    wherein when a side surface of the electric unit is caused to move closer to a lateral side surface of the other unit when acted on by an external factor, a wire-protecting portion, being held directly between the side surface of electric unit and the lateral side surface of the other unit, keeps the distance between said electric unit and said wiring, the distance between said other unit and said wiring, and between the electric unit and the other unit, at respective distances that are at least distances necessary for protecting said wiring, by contacting the lateral side surface of the other unit,
    wherein said wire-protecting portion is a bracket connected to said electric unit that protrudes laterally toward said other unit and said bracket holds said wire, and
    wherein said closed space is an engine room, and said other unit is an engine body.

2. The mount structure for the electric unit according to claim 1, wherein said electric unit is an electric unit for a voltage of at least 42 V.

3. The mount structure for the electric unit according to claim 1, wherein said electric unit includes an inverter.

4. A mount structure for an electric unit mounted in a closed space of a vehicle, comprising:
    a base body;
    the electric unit mounted on said base body and in the closed space of the vehicle;
    another unit mounted on said base body and laterally spaced from said electric unit; and
    a wiring connected to said electric unit and having a portion positioned between said electric unit and said other unit;
    wherein when a side surface of the electric unit is caused to move closer to a lateral side surface of the other unit when acted on by an external factor, a wire-protecting portion, being held directly between the side surface of electric unit and the lateral side surface of the other unit, keeps the distance between said electric unit and said wiring, the distance between said other unit and said wiring, and between the electric unit and the other unit, at respective distances that are at least distances necessary for protecting said wiring, by contacting the lateral side surface of the other unit,
    wherein said wire-protecting portion is a bracket connected to said electric unit that protrudes laterally toward said other unit and said bracket holds said wire, and
    wherein said electric unit includes an inverter, said closed space is an engine room, and said other unit is an engine body.

5. The mount structure for the electric unit according to claim 4, wherein said electric unit is an electric unit for a voltage of at least 42 V.

6. A mount structure for an inverter mounted in an engine room of a vehicle, comprising:
    a base body;
    the inverter mounted on said base body and in the engine room of the vehicle;
    an engine body mounted in said engine room and laterally spaced from said inverter;
    a wiring connected to said inverter and having a portion positioned between said inverter and said engine body; and
    a bracket connected to said inverter that protrudes toward the engine body to hold the wiring,
    wherein when a side surface of the inverter is caused to move closer to a lateral side surface of the engine body when acted on by an external factor, the bracket, being held directly between the side surface of inverter and the lateral side surface of the engine body, keeps the distance between said inverter and said wiring, the distance between said engine body and said wiring, and between the inverter and the engine body, the respective distances are at least distances necessary for protecting said wiring, by contacting the lateral side surface of the engine body.

7. The mount structure for the inverter according to claim 6, wherein said inverter is for a voltage of at least 42 V.

8. A mount structure for an electric unit mounted in a closed space of a vehicle, comprising:
a base body;
the electric unit mounted on said base body and in the closed space of the vehicle;
another unit mounted on said base body and spaced from said electric unit;
a wiring connected to said electric unit and having a portion positioned between said electric unit and said other unit; and
wherein when a side surface of the electric unit is caused to move closer to a lateral side surface of the other unit when acted on by an external factor, a wire-protecting portion, being held directly between the side surface of electric unit and the lateral side surface of the other unit, keeps the distance between said electric unit and said wiring, the distance between said other unit and said wiring, and between the electric unit and the other unit, at respective distances that are at least distances necessary for protecting said wiring, by contacting the lateral side surface of the other unit,
wherein said electric unit includes an inverter,
wherein said closed space is an engine room, and said other unit is an engine body, and
wherein said wire-protecting portion is a spacer connected to a component other than said electric unit and said other unit and is positioned between said electric unit and said other unit, and said spacer holds said wiring.

* * * * *